(12) United States Patent
Sarubin et al.

(10) Patent No.: US 11,675,853 B2
(45) Date of Patent: Jun. 13, 2023

(54) SYSTEMS AND METHODS FOR PROCESSING METADATA

(71) Applicant: NBCUniversal Media, LLC, New York, NY (US)

(72) Inventors: Horst Christopher Sarubin, Granada Hills, CA (US); Anne L. Chang-Ferguson, Sunland, CA (US)

(73) Assignee: NBCUniversal Media, LLC, New York, NY (US)

( * ) Notice: Subject to any disclaimer, the term of this patent is extended or adjusted under 35 U.S.C. 154(b) by 714 days.

(21) Appl. No.: 16/715,965

(22) Filed: Dec. 16, 2019

(65) Prior Publication Data

US 2020/0210753 A1 Jul. 2, 2020

Related U.S. Application Data

(60) Provisional application No. 62/786,069, filed on Dec. 28, 2018.

(51) Int. Cl.
| | |
|---|---|
| G06F 16/908 | (2019.01) |
| G06F 16/45 | (2019.01) |
| G06F 16/48 | (2019.01) |
| H04N 21/466 | (2011.01) |
| H04N 21/84 | (2011.01) |
| G06F 18/24 | (2023.01) |
| G06F 18/214 | (2023.01) |

(52) U.S. Cl.
CPC ............ *G06F 16/908* (2019.01); *G06F 16/45* (2019.01); *G06F 16/48* (2019.01); *G06F 18/214* (2023.01); *G06F 18/24* (2023.01); *G06F 18/24765* (2023.01); *H04N 21/4665* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 8,311,277 B2 * | 11/2012 | Peleg | G06F 16/739 |
| | | | 382/103 |
| 2010/0125581 A1 * | 5/2010 | Peleg | G06V 20/47 |
| | | | 707/E17.005 |
| 2012/0143923 A1 * | 6/2012 | Whitney | G06F 16/907 |
| | | | 707/E17.005 |
| 2020/0210753 A1 * | 7/2020 | Sarubin | G06F 16/48 |

FOREIGN PATENT DOCUMENTS

WO     2018218184 A1     11/2018

OTHER PUBLICATIONS

European Office Action; EP Application No. 19219705.1; dated Sep. 1, 2021.

* cited by examiner

*Primary Examiner* — Tahmina N Ansari
(74) *Attorney, Agent, or Firm* — Fletcher Yoder, P.C.

(57) ABSTRACT

Systems and methods are provided herein for processing digital content. A registry includes a set of common registry identifiers used to classify metadata. Further, an interchange layer and registry classification service: receives metadata derived from digital content in a content file; and classifies the metadata, by associating the metadata with one of the common registry identifiers, based upon a classification from a set of classification rules that is associated with a metadata type of the metadata.

20 Claims, 3 Drawing Sheets

SYSTEMS AND METHODS FOR PROCESSING METADATA

CROSS-REFERENCE TO RELATED APPLICATIONS

This application claims priority of U.S. Provisional Patent Application No. 62/786,069, entitled Systems and Methods for Processing Metadata, filed Dec. 28, 2018, which is herein incorporated in its entirety by reference.

BACKGROUND

The present invention relates generally to the field of digital content, such as video, audio, multi-media and other content, and more particularly to techniques for universal identification and access to metadata descriptive of the content via a universal metadata identifier, where the universal metadata identifier reduces reliance and use of proprietary metadata schemes of metadata sources.

A wide range of digital content has been converted from legacy content such as film, and an ever-increasing amount of digital content is being created directly through digital media. Such digital content may include, for example, television programming, movies, videos, audio files (e.g., music), and so forth. Varying methods have been developed in recent years for associating such content with metadata that can include a wide range of information relating to the content itself. Conventional production software that stores production metadata during picture production and post-production may be named or described differently, as there is no agreed upon standard for metadata regarding naming, usage, and/or retention of the metadata.

Without a defined standard to name metadata, many difficulties arise in working with digital content. For example, without a defined standard to name metadata, it can be extremely difficult and cumbersome to know when and what kind of metadata is available to access for use for a project. Additionally, without a defined retention policy for the metadata, it is difficult to know what kind of metadata can be removed or deleted or even altered. Furthermore, appropriate management of metadata can be both time consuming and expensive, and is prone to error. It will be appreciated that the difficulties in categorizing and managing the retention of metadata creates more work during production and post-production due to the time spent on searching and recovering information from the metadata that may have been deleted or lost due to the metadata being accessed by many production staff members.

There is a need, therefore, for improved techniques for naming, categorizing, and accessing metadata with digital content. There is a particular need for techniques that can allow for reliable categorization of digital content with metadata, based upon a persistent identifier that can be used when the metadata is stripped from the content.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The current embodiments relate to a universal categorization of digital content metadata, based upon registry identifier that can be used when the metadata is stripped from the content to classify metadata. To perform the unification of the metadata, two tasks may need occur. First, metadata types may be identified and associated with registry IDs. This enables the second task of associating metadata that is received at the interchange layer and registry classification service with a relevant registry ID. Once the registry IDs are generated and the registry is updated, the interchange layer and registry classification service may associate metadata with a relevant registry ID. Upon receipt of an asset with metadata, the interchange layer and registry classification service strips the metadata and stores the stripped metadata in a separate file from the asset containing the metadata. The stripped metadata is associated with a particular registry ID, which acts to provide an indication of a classification of the metadata. This stripped metadata, with its corresponding registry ID from the registry, is then stored in the master production database. It may be appreciated that queries or changes to the assets and/or the metadata may be made via an orchestration layer service. For example, a user may enter a command via a user interface of a computing device to modify the asset via the orchestration layer service.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, in some instances, there is a need, therefore, for improved techniques for naming and accessing metadata with digital content. Given that the same content files and metadata passes through various phases of production, name variations, deleted data, and other issues arise when multiple parties access and edit these content files. As such there is a particular need for techniques that can allow for reliable universal categorization of digital content metadata, based upon a persistent identifier that can be used when the metadata is stripped from the content. It may be appreciated that agreement upon non-creative aspects (e.g., categorization of metadata) enables production and post-production staff to spend their time and resources into creative aspects of the filmmaking process. As described herein, the presently disclosed techniques enable various types of metadata to be categorized more readily, by enabling various types of naming conventions to be processed by an interchange layer and registry classification service.

The content processing system also preserves the entire history of any type of metadata (e.g., a shot, image, video footage, etc.) via a storage system. The metadata may be stored and/or accessed via block chain technology or by using a distributed ledger. As such, access and/or rights to modify the metadata may be limited to those with permission to do so.

By automating the process of identifying various types of metadata and automatically categorizing metadata, significant cost and/or time savings may be realized. Accordingly, a content processing system in accordance with the present embodiments may substantially reduce the time it takes to process a tremendous amount of multimedia content and identify the types of metadata, especially in cases in which the naming convention varies.

System Overview

Figure 1:
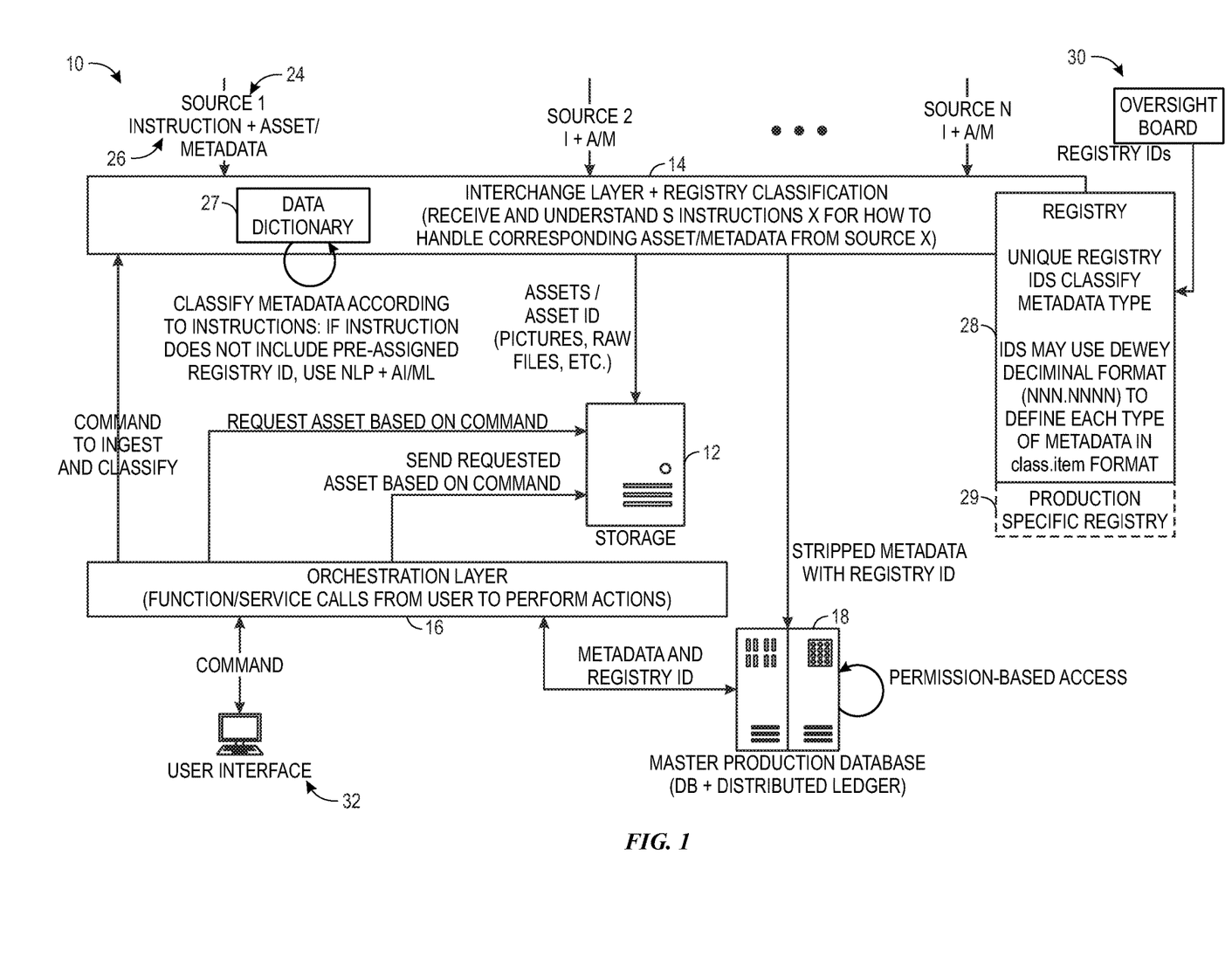
FIG. 1 is a schematic view of a production framework for processing metadata, in accordance with an embodiment of the present disclosure.

Turning now to the drawings, and referring first to FIG. 1, a content processing system 10 is illustrated diagrammatically, that may form part of a digital asset management (DAM) system, a media asset management (MAM) system or a content management system (CMS), all of which may be considered forms of DAM systems. In general, such systems may allow for the control of storing, reproducing, ingestion, annotation, cataloging, retrieval and distribution of digital assets, such as photographs, movies, television productions, animations, video, music and other audio productions, and so forth. Such systems may also facilitate the production of these assets, as well as production of derivative works, analysis and analytics of the assets, and the packaging of such works for distribution to audiences and to post-production companies. As will be explained in detail below, the system 10 includes a storage system 12, an interchange layer and registry classification service 14, an orchestration layer service 16, and a master database 18.

In the illustrated example, the system 10 includes the interchange layer and registry classification service 14 which receives and interprets instructions for handling corresponding assets 24 and/or metadata 26 from various sources. The interchange layer and registry classification service 14 may provide an application programming interface (API) which provides a mechanism to supply metadata instructions, which will ultimately result in automatic mapping of metadata to prescribed registry IDs, as will be discussed in more detail below. The interchange layer and registry classification service 14 receives a collection of files. In this case, the interchange layer and registry classification service 14 receives multiple assets, such as a content file 24 and associated metadata 26. It may be appreciated that the interchange layer and registry classification service 14 can be accessed by and receive assets from a variety of production teams in the filmmaking process. In practice, several content files (e.g., multiple video clips, sequences, versions, etc.) may be received by the interchange layer and registry classification service 14, as may be several metadata-only files. It should also be noted that the term "files" as used in the present discussion, may include both stored data and streaming content. The content, depending upon the processing contexts, may sometimes be referred to as an asset. The metadata 26 will typically come from various sources (e.g., source 1, source 2, etc.) or vendors and will relate to the content and may provide additional information about the content, such as title, identifying data, source, various date and time stamps, and so forth. The metadata may be used to track the content and therefore facilitate its management through production, post production, storage, retrieval, commercial and non-commercial distribution, and so forth.

For the purposes of the present discussion, the interchange layer and registry classification service 14 facilitates unification/universalization of the metadata 26. The unification/universalization of the metadata 26 may result in a centralized authority of metadata from various metadata sources that is stored with common metadata type identifiers and with an authoritative management scheme that sets retention and modification policies for the metadata.

The interchange layer and registry classification service 14 will typically include one or more appropriately programmed computers as described below. Moreover, the interchange layer and registry classification service 14 allows for processing of assets (e.g., video files) metadata, and instructions regarding how the assets and the metadata relate to each other. Specifically, the interchange layer and registry classification service 14 may receive any number of instructions. For example, one such instruction may include intaking content and/or metadata from a file. Another such instruction could include making a file smaller to adjust viewing settings for a different device, searching the metadata for a certain logo, adjusting a video file format, and so forth. In some instances, the metadata 26 may not include an instruction to be processed.

Here, the interchange layer and registry classification service 14 may access data dictionary 27 and a registry 28 to classify metadata types. The data dictionary 27 may store and implement classification rules to apply to incoming metadata 26 to generate records that provide a classification of the metadata 26 as one or more of the unique registry IDs found in the registry 28. For example, the data dictionary 27 may establish record names, sources of metadata 26 to monitor/classify, classification rules for the metadata 26, etc. A certain number of pre-defined classification rules may exist. However, as will be discussed in more detail below, in some situations pre-existing classification rules may not exist for certain metadata 26, In such cases, the interchange layer and registry classification service 14 may use natural language processing (NLP), artificial intelligence, machine learning (ML), or another suitable learning type via a training model to match metadata 26 to the corresponding categories for the different types of metadata as provided in the registry 28, and as explained in further detail below. As these techniques are used, the data dictionary 27 may be expanded to incorporate insight gleaned from use of these techniques, and serve as a trained machined learning model for categorizing the metadata 26.

A goal of the interchange layer and registry classification service 14 is to map the received metadata to the master production database 18, which stores all relevant metadata for a production project. Indeed, the metadata 26 is processed based on the registry 28 and is eventually mapped to the master production database 18, as explained in further detail below. Referring to the registry 28, it may be appreciated that the registry 28 itself may ultimately be open to the industry, thus enabling updates to the registry IDs to be added regularly. Moreover, the registry 28 may be ultimately overseen by one or more industry oversight boards 30. Examples of the registry IDs may include an actor name, a location, a genre, a scene type, a clip type, among others.

The registry 28 may be a component within the interchange layer and registry classification service 14 and may be analogized to a glossary or look up table that includes a list of registry IDs, and each registry ID defines a type of metadata. The registry IDs may track metadata that may be present within a production life cycle, and the registry 28 may include a corresponding description of the registry ID. In some embodiments, a production specific registry 29 section may provide registry IDs that relate to a specific production, enabling metadata that is specific to a particular production to integrate into the same processing as non-production-specific metadata. In some instances, specialized production specific data dictionary rules may also be implemented to associate metadata 26 to registry IDs of the production-specific registry 29. A graphical user interface (GUI) may be provided to provide metadata mappings for production-specific metadata to the production-specific registry 29.

In one non-limiting example, the registry 28 may use a classification system for the registry ID in the format of NNN.NNNN where 'NNN' is a gross classification that refers to a metadata class and 'NNNN' is a specific classification that refers to an item within the metadata class. A metadata class may be defined as a broad category or subject describing the metadata type. For example, the metadata class might be broad classifications that different categories of metadata types could fall under, such as a cinematography class, a story class, a visual effects, class, etc. Each of these classes may have specific metadata types associated with them. For example, the cinematography class might include metadata types that relate to technical motion picture metadata, such as frames per second (fps), time code (tc), time code in (tc-in), file type, frame number, etc. In another example, the story metadata class could have particular metadata related to the story represented by the asset, such as character names, genre, title, etc. The entire accumulated identifier (e.g., NNN.NNNN) can be referred to as the entire registry ID. It may be appreciated that the registry 28 can accommodate new metadata types, unassigned registry IDs, or generic registry IDs for increased flexibility in the registry system. For example, the film industry may assign new metadata types, etc. for 4 k resolution video footage, as higher resolution versions of video footage becomes available.

To further illustrate the registry 28, an example is now provided. In the registry 28, registry IDs include:
    100.0001 (camera metadata).(camera serial number)
    100.0100 (camera metadata).(clip ID)
    100.0101 (camera metadata).(total number of frames within a clip ID)

In this example, gross classification ID 100 is used to indicate all metadata associated with a "camera metadata" class. The specific classification 0001 in the camera metadata class indicates that the metadata is camera serial number data. The specific classification 0100 in the camera metadata class indicates that the metadata is clip ID number data. The specific classification 0101 in the camera metadata class indicates that the metadata relates to a total number of frames within a clip ID.

To perform the unification/universalization of the metadata 26, two tasks may occur. First, metadata types may be identified and associated with registry IDs. This enables the second task of associating metadata that is received at the interchange layer and registry classification service 14 with a relevant registry ID.

Generally speaking, metadata types (and their corresponding registry IDs) may be identified based upon industry standards, an industry oversight board, and/or based upon natural language processing, artificial intelligence, or machine learning that may be used to identify corresponding categories for the different types of metadata that is received at the interchange layer and registry classification service 14. Registry IDs may be generated for each of the metadata types and the registry may be updated with the generated registry IDs. A certain number of pre-defined metadata types and associated registry IDs may be provided to capture popular metadata types. However, in some instances, certain less-frequent metadata may not be associated with a particular Registry ID. Thus, the interchange layer and registry classification service 14 may use AI/ML to derive new Registry IDs. For example, if classification of several camera raw file types has been completed, AI/ML, techniques may be implemented to add additional raw camera raw metadata from unclassified manufactures. For example, this could occur via payload pattern matching between payloads of classified manufacturers' metadata against payloads of unclassified manufacturers' metadata. As the registry is built out (e.g., expands to include additional classifications/registry IDs), the expanded entries may be used as a training set for the ML. New metadata may then be ingested and classified from the similar payload/file type. In situations where mappings can be suggested, a proposal indication of the mapping may be provided via a graphical user interface (GUI) for human confirmation. If no suggestion can be developed, a non-classification indication may be provided via a GUI to facilitate human mapping. As the confidence of the robustness and accuracy of mapping suggestions increase, the ease of expanding the registry 28 increases.

Once the registry IDs are generated and the registry 28 is updated, the interchange layer and registry classification service 14 may associate metadata with a relevant registry ID. Upon receipt of an asset with metadata, the interchange layer and registry classification service 14 strips the metadata and stores the stripped metadata in a separate file from the asset. The stripped metadata is associated with a particular registry ID, which acts to provide an indication of a classification of the metadata. This stripped metadata, with its corresponding registry ID from the registry, is then stored in the master production database 18.

In some embodiments, a relevant registry ID may be indicated by the asset/metadata source. However, in other embodiments, natural language processing, artificial intelligence, or machine learning that may be used to identify a relevant registry ID to associate with the metadata. The following example illustrates one embodiment of how the registry 28 could be used to associate received metadata with a relevant registry ID. For discussion sake, assume that a piece of metadata refers to a "shot" and other information related to the shot. If no registry ID is included in the metadata, the training model would process the word "shot" and any other accompanying metadata to determine whether "shot" refers to a specific registry ID that could include: a specific perspective seen through a camera, a previously recorded clip of video footage, a clip on a timeline, a sound effect of gunfire, or even a typographical error where "shoot" was the intended phrase, having an entirely different meaning. It may be appreciated that other registry IDs may be generated when other languages besides English are considered by the training model. The registry 28 stores each of the potential registry IDs for future classification of the metadata types.

As mentioned above, a GUI may provide a mechanism to allow delegated production users to set up schemas for metadata workflows, provide custom production-specific metadata sets, and provide mapping of unclassified metadata fields. Further, AI/ML may identify patterns from metadata sets, their source, and NLP (natural language processing) of metadata fields and data names to build suggestions of how to classify metadata fields.

For example, if unclassified metadata fields come from a camera raw file type, ML prediction models may be based off of the camera raw fields already in the registry. Patterns of all the metadata field types may be derived against classified metadata of a similar metadata type, which likely have similar patterns and/or sources. Using NLP to spot fuzzy logic similarities to other field names and data and finding patterns in the input data may provide the basis for prediction of classification mappings for previously unclassified metadata fields. Depending on implemented rules, these predictions can be implemented in a number of different manners. In one scenario, the predictions may be automatically implemented by storing classification rules in the data dictionary 27. In some embodiments, this may occur when a certain prediction likelihood of certainty threshold is reached (e.g., as indicated by the strength of the pattern). In some instances, the predictions may be selectively chosen by providing the predictions to authorized production personnel via a GUI. In some embodiments, predictions may be provided to a governance body (e.g., the oversight board 30) for the registry to evaluate if the new classifications should be added to the registry 28. Upon approval by the oversight board 30, classification rules may be added to the data dictionary 27 and/or additional registry IDs may be added to the registry 28 and/or production specific registry 29.

The workings of the training model will be described in further detail below, with reference to FIG. 2.

In general, the techniques described herein allow for the use of audio and/or video content recognition tools in a management workflow that are tied to metadata identification and classification standards to track content as it moves through different stages of production, post-production, storage, retrieval, distribution, and so forth. The interchange layer and registry classification service 14 also allows for tighter controls of content for security purposes and permits verification that information contained in metadata actually reflects the proper content.

In some embodiments, the asset and its associated asset ID (e.g., pictures, untouched raw files, etc.) are stored in the storage system 12. It may be appreciated that changes to the assets and/or the metadata may be made via the orchestration layer service 16. As will be described in further detail below, a user may enter a command via a user interface 32 of a computing device to modify the asset. By storing the asset and its associated asset ID in the storage system 12, changes made by the user's modification via the orchestration layer service 16 can be tracked and stored in the storage system 12 and/or the master production database 18. Therefore, metadata corresponding to an asset may be updated even after initial ingesting at the interchange layer and registry classification service 14.

The orchestration layer service 16 will typically include one or more appropriately programmed computers as described below. A primary function of the orchestration layer service 16 includes receiving commands to run tasks or instructions on the assets. For example, the orchestration layer service 16 may scrape assets of the metadata, organize the metadata, request an asset based on a command, and the like. It may be appreciated that while the interchange layer and registry classification service 14 is accessible to the industry, the orchestration layer service 16 may be closed to the industry. In this example, only those with permission may instruct the orchestration layer service 16 to access the metadata, perform a function or service, etc.

Generating and Using Registry IDs for Classification

Figure 2:
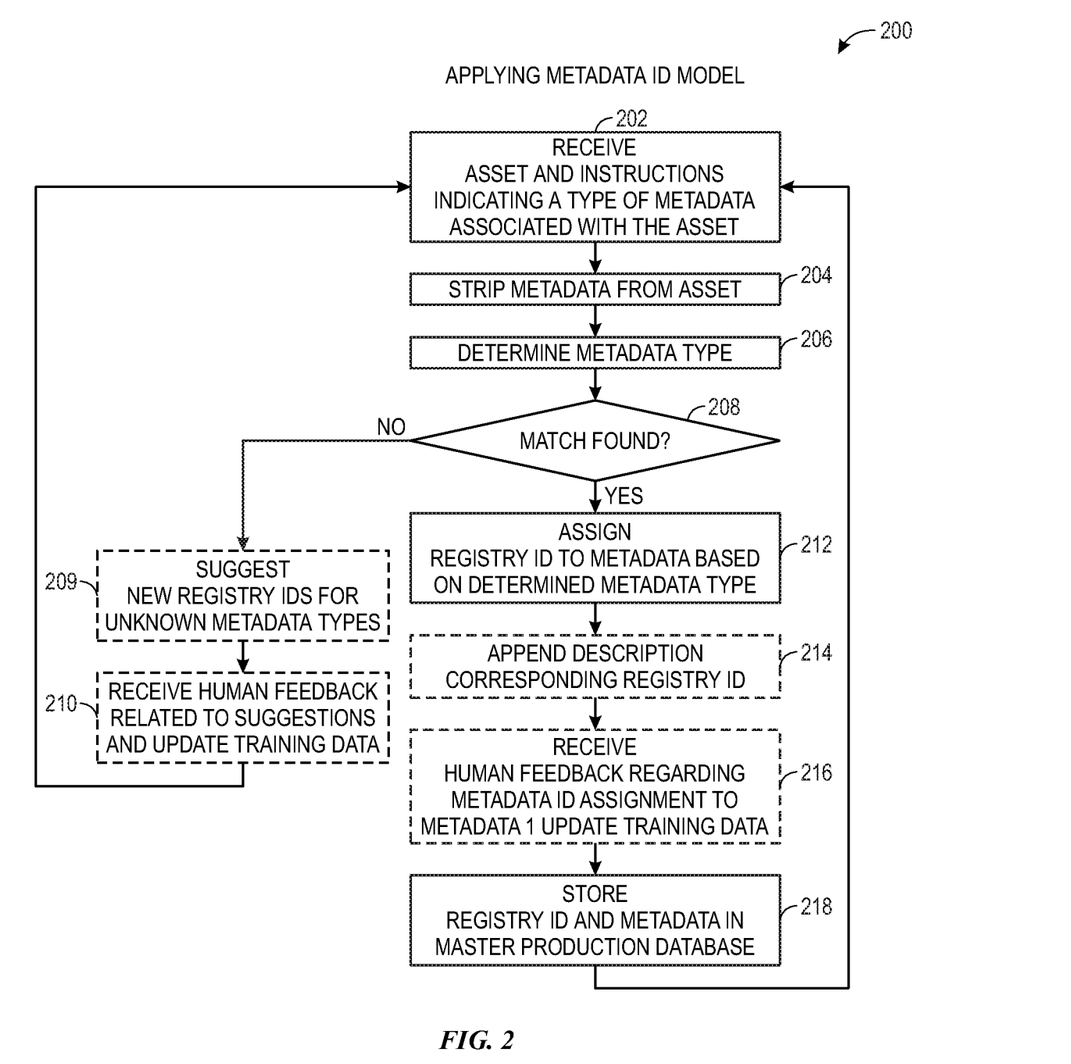
FIG. 2 is a flow diagram illustrating a process for determining types of metadata associated with a content file and assigning the metadata to one or more registry IDs via machine learning, in accordance with an embodiment of the present disclosure.

FIG. 2 depicts a flow diagram illustrating a process 200 for identifying registry IDs and assigning metadata to the registry IDs by identifying types of metadata. As will be explained in further detail below, the process 200 determines registry IDs useful for classification of metadata for a given production project that should be created. In other words, process 100 generates the classification buckets for different metadata that is received by the Interchange Layer and Registry Classification Services 14. Then, the registry IDs can be assigned to metadata, thus providing a universal classification for the metadata.

In some embodiments, at least a portion of the determined registry IDs may be based on the assets and/or associated metadata received by the interchange layer and registry classification services 14. In some embodiments, at block 202, the interchange layer and registry classification service 14 receives the assets and their corresponding instructions (when available) to indicate a type of metadata associated with the asset. It may be appreciated that the assets may be received from a variety of sources, each with their own metadata policies and naming conventions. In some embodiments, one or more of the sources may provide instructions with the metadata. In these instances, the interchange layer and registry classification service 14 may classify the metadata according to the instructions. In other instances, when the one or more sources do not provide instructions with the metadata, machine learning may be applied to determine a type of metadata associated with the asset as explained herein.

At block 204, the interchange layer and registry classification service 14 may strip the metadata from the asset and determine the metadata type. The interchange layer and registry classification service 14 may access the registry 28 to attempt to match each type of metadata to a metadata class and an item within the metadata class. As discussed above, in one aspect, the matching may be performed based on instructions accompanying the metadata. In another aspect, the matching may be performed using a machine learning process.

At block 206, the interchange layer and registry classification service 14 attempts to determine the metadata type by determining if a match can be found from the known, existing classes/metadata types located in the registry 28 (block 208). In an aspect, the interchange layer and registry classification service 14 may generate a confidence level value indicating the degree to which the metadata is a likely match for a registry ID within the registry 28. If the interchange layer and registry classification service 14 determines that no match is found (block 208), the interchange layer and registry classification service 14 may suggest a new registry ID for the unknown classes/types of metadata. The interchange layer and registry classification service 14 may also suggest or create a new registry ID in the registry 28 when certain metadata types do not appear to meet a threshold confidence level, which may indicate that the registry ID is not a strong match with existing registry ID types. In some embodiments, the interchange layer and registry classification service 14 may create a new registry ID when there are a certain number of instances of unmatched metadata types or if another criteria to proceed with creating the new registry ID is met. Indeed, the interchange layer and registry classification service 14 may analyze the unmatched metadata types to determine if one or more patterns or characteristics common to the unmatched metadata can be identified to suggest the new registry ID. For example, assuming there was no frame per second metadata type in the registry, but various metadata comes in with a label of "frames per second", "f/s", and/or "FPS", each with similar metadata values, a pattern may be identified, and these labels may be automatically found to be analogous to one another. Once a particular amount of analogous metadata is received, but does not have a corresponding registry ID, the interchange layer and registry classification service 14 may recommend a new registry ID and/or automatically generate one.

At block 210, after the new registry ID is created, in some embodiments, human feedback is received to verify the newly suggested registry ID. If the human feedback indicates that the new registry ID is not an appropriate registry ID to include in the registry 28, the new registry ID is deleted and is not added to the bank of registry IDs. The feedback may be used to make adjustments to computer programs to generate more accurate registry IDs. For example, over time, a training model may be progressively improved with less human feedback required. Thus, machine learning and natural language processing may make better predictions as to when and what registry IDs to recommend and/or automatically generate for future unclassified metadata.

If the human feedback indicates that the new registry ID is indeed a reasonable registry ID to include in the registry, the new registry ID is added to the bank of registry IDs. It may be appreciated that the registry 28 may reclassify earlier categorized registry IDs if the newly created registry ID is a better match to certain metadata types. In some embodiments, the registry may add the newly created registry ID to the earlier categorized registry ID instead of reclassifying it, so that a particular metadata type has more than one registry ID assigned. In another example, the interchange layer and registry classification service 14 may search for metadata associated with a registry ID and that have a confidence level value a confidence level threshold for the registry ID. In addition to the registry ID and the confidence level value, the search may include other parameters include key words within the metadata. The interchange layer and registry classification service 14 may reclassify the metadata match the search criteria, and therefore, bulk reclassify metadata that may have misclassified.

If the registry 28 determines that a match can be found (block 212), the registry 28 assigns a registry ID based on the determined metadata type. As explained above, the registry 28 may use a classification system for the registry ID in the format of NNN.NNNN where 'NNN' refers to a metadata class and 'NNNN' refers to an item within the metadata class. In one example, a metadata class could be "story" and the metadata type could be "actor" and the metadata associated with the registry ID story.actor could be any number of actors, such as Tom Cruise, Denzel Washington, John Cho, etc. In practice, the registry ID may use numerical class and metadata type identifiers, in lieu of natural language identifiers. For example, the registry ID for story.actor might be represented as registry ID: 000.0001, where numerical class indicator 000 is associated with "story" class metadata and numerical type indicator 0001 is associated with "actor" type metadata.

At block 214, the registry 28 may append one or more descriptions corresponding to a registry ID. For example, natural language descriptions may be provided. The appended descriptions may be used for subsequent natural language processing and/or machine learning as described in more detail below.

At block 216, human feedback may optionally be received and applied to the determined metadata type and registry ID for validation, as described above with reference to block 210. Over time, a training model is progressively improved with less human feedback required. Thus, machine learning and natural language processing may make better predictions as to particular registry IDs to metadata associations.

At block 218, the registry IDs and the metadata are stored in the master production database 18. For example, continuing with the actor metadata example described above, the master production database 18 may include an entry that indicates that there is metadata "Tom Cruise" that is associated with registry ID story.actor. Additionally, an association to the corresponding asset may also be stored (e.g., all metadata corresponding to a project, show, or film may be assigned an asset ID or file ID).

Figure 3:
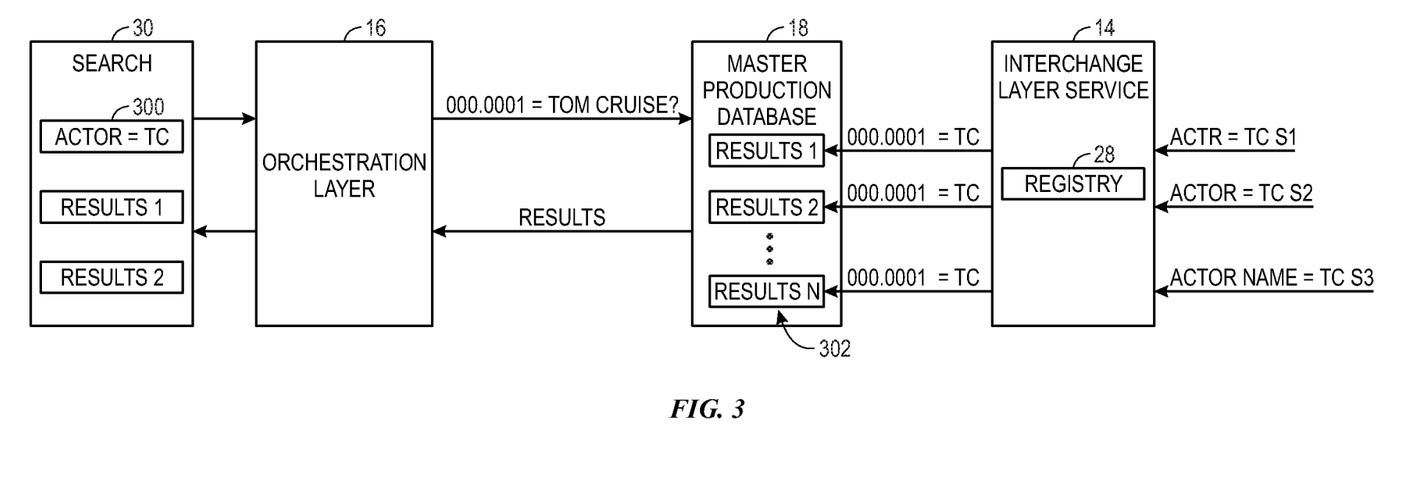
FIG. 3 is a schematic view of an example of the process of FIG. 2, in accordance with an embodiment of the present disclosure.

FIG. 3 depicts a schematic view of an example illustrating certain benefits of the universal metadata classification described herein. In the illustrated example, a user has entered a query 300 via a user interface 32 of a computing device to search for certain video clips including the actor Tom Cruise. When receiving the query 300, the orchestration layer service 16 executes the query 300 to search for the video clips including Tom Cruise by accessing the master production database 18. As described above, the orchestration layer service 16 searches the master production database 18 for a metadata class of "story" and the metadata type of "actor", looking for a specific metadata value (i.e., "Tom Cruise") within the metadata class.

Because the metadata types have been identified and associated with registry IDs contained in the registry 28, the orchestration layer service 16 can readily access the extensive data compiled in the master production database 18 to pull the relevant metadata using a single registry ID (e.g., 000.0001 as provided in the example above). Here, the orchestration layer service 16 retrieves various results 302 for the query of "actor=Tom Cruise." It may be appreciated that the registry 28 of interchange layer and registry classification service 14 associated various types and differently tagged metadata with the relevant registry ID 000.0001. In the illustrated example, the registry 28 associated metadata tagged as "actr" from source 1, metadata tagged as "actor" from source 2, and metadata tagged as "actor name" from source 3 with one common relevant registry ID to query each of the metadata associated with the metadata class of story (represented by numerical class ID 000) and metadata type of "actor" (represented by numerical metadata type ID 0001) and the specific metadata value (i.e., Tom Cruise). Because the metadata from these various sources are also associated with relevant assets in the storage system 12, the relevant assets may also be retrieved with ease.

In contrast to the universal query 300 that is made possible by the universal classification by the interchange layer and registry classification service 14, systems without such a classification would have to perform a complex query to arrive at similar results. For example, the complex query would have to account for mismatched metadata tagging from the various metadata sources, thus requiring a compound query for: (Source1.Actr="Tom Cruise" or Source2.Actor="Tom Cruise" or Source3.ActorName="Tom Cruise"). As may be appreciated, with an increasing number of metadata sources, this type of query could be extremely complex and cumbersome.

It may be appreciated that the query 300 may include various metadata classes for a particular query. Indeed, the user can search the master production database 18 for metadata with other relevant registry IDs. For example, in addition to the query of "story.actor=Tom Cruise," the user can specify a type of metadata, a specific movie that the video footage is associated with, a length of time of the video clip, a particular scene, instances of the actor occurring with a certain actor/actress, and so forth.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system for processing digital content comprising:
a registry comprising a set of common registry identifiers used to classify metadata; and
an interchange layer and registry classification service configured to:
receive metadata derived from digital content in a content file, wherein the metadata is not classified in accordance with the set of common registry identifiers;
receive additional metadata that is not classified in accordance with the set of common registry identifiers;
determine the metadata correlates to the additional metadata by identifying a pattern between the metadata and the additional metadata;
generate a new registry identifier associated with the metadata and the additional metadata; and
classify the metadata and the additional metadata, by associating the metadata and the additional metadata with the new registry identifier.

2. The system of claim 1, further comprising:
a database configured to store the metadata, the additional metadata, and an association with the new registry identifier.

3. The system of claim 2, further comprising an orchestration layer service configured to:
perform one or more actions regarding the metadata, perform one or more actions regarding the digital content, or both.

4. The system of claim 1, wherein the metadata or the additional metadata is classified based upon a classification from a set of classification rules that is associated with a metadata type, and wherein the metadata type comprises a class type and an item type.

5. The system of claim 1, wherein a common registry identifier of the set of common registry identifiers comprises a gross classification indication of a class of metadata and a specific classification associated with the class of metadata.

6. The system of claim 5, wherein the common registry identifier comprises a string concatenating the gross classification indication and the specific classification with a separating symbol.

7. The system of claim 6, wherein the separating symbol comprises a period.

8. The system of claim 1, wherein the interchange layer and registry classification service comprises an application programming interface (API) configured to receive instructions regarding the metadata from a plurality of metadata sources.

9. The system of claim 8, wherein the instructions result in automatic classification of the metadata or the additional metadata to the new registry identifier.

10. The system of claim 1, wherein the interchange layer and registry classification service comprises a data dictionary, the data dictionary comprising the set of classification rules for the metadata, and wherein the metadata is classified based on the data dictionary.

11. The system of claim 1, wherein the interchange layer and registry classification service is configured to expand the set of classification rules to include additional classification rules using machine learning applied to unclassified metadata.

12. The system of claim 11, wherein the machine learning uses known classification rules of a data dictionary as training data.

13. The system of claim 12, wherein when a gross classification of the unclassified metadata is known, the known classification rules comprise known classification rules associated with a subset of the metadata having a common gross classification as the unclassified metadata.

14. The system of claim 11, comprising a graphical user interface (GUI), configured to selectively enable a subset of the additional classification rules based upon a classification rule selection via the GUI.

15. The system of claim 1, wherein the interchange layer and registry classification service is configured to expand the set of common registry identifiers to include the new registry identifier using machine learning applied to the metadata not classified in accordance with the set of common registry identifiers or the additional metadata not classified in accordance with the set of common registry identifiers.

16. The system of claim 15, comprising a graphical user interface (GUI), configured to selectively enable a subset of additional registry identifiers based upon a registry identifier selection via the GUI.

17. A tangible, non-transitory, machine-readable medium, comprising computer-readable instructions that, when executed by one or more processors of a computer, cause the computer to:
receive metadata derived from digital content in a content file, wherein the metadata is not classified in accordance with a set of common registry identifiers;
receive additional metadata that is not classified in accordance with the set of common registry identifiers;
determine the metadata correlates to the additional metadata by identifying a pattern between the metadata and the additional metadata;
generate a new registry identifier associated with the metadata and the additional metadata; and
classify the metadata and the additional metadata, by associating the metadata and the additional metadata with the new registry identifier; and store the metadata, the additional metadata, and an association with the new registry identifier.

18. The machine-readable medium of claim 17, wherein the computer-readable instructions, when executed by the one or more processors, cause the computer to:
  expand a set of classification rules to include additional classification rules using machine learning applied to unclassified metadata;
  expand the set of common registry identifiers to include the new registry identifier using the machine learning applied to the unclassified metadata; or
  both.

19. A method, comprising:
  receiving, via one or more computers, metadata derived from digital content in a content file, wherein the metadata is not classified in accordance with a set of common registry identifiers;
  receiving, via the one or more computers, additional metadata that is not classified in accordance with the set of common registry identifiers;
  determining, via the one or more computers, the metadata correlates to the additional metadata by identifying a pattern between the metadata and the additional metadata;
  generating, via the one or more computers, a new registry identifier associated with the metadata and the additional metadata; and
  classifying, via the one or more computers, the metadata and the additional metadata, by associating the metadata and the additional metadata with the new registry identifier; and
  storing, in a data store, the metadata, the additional metadata, and an association with the new registry identifier, wherein a common registry identifier of the set of common registry identifiers comprises a concatenated string comprising a gross classification indication and a specific classification indication associated with the gross classification indication, separated by a symbol.

20. The method of claim 19, comprising classifying, via the one or more computers, at least a portion of the metadata with one or more production-specific registry identifiers of a production-specific registry that is independently associated with a content production.

* * * * *